US009630189B2

(12) United States Patent
Swan

(10) Patent No.: US 9,630,189 B2
(45) Date of Patent: Apr. 25, 2017

(54) METHOD AND APPARATUS FOR SPRAYING GROUND SURFACES

(71) Applicants: Syngenta Participations AG, Basel (CH); Hypro EU Limited, Cambridge Cambridgeshire (GB)

(72) Inventor: Trevor William Bartlett Swan, Cambridge (GB)

(73) Assignees: Syngenta Participations AG, Basel (CH); Hypro EU Ltd., Cambridge (GB)

(*) Notice: Subject to any disclaimer, the term of this patent is extended or adjusted under 35 U.S.C. 154(b) by 0 days.

(21) Appl. No.: 14/761,988

(22) PCT Filed: Jan. 17, 2014

(86) PCT No.: PCT/EP2014/050944
§ 371 (c)(1),
(2) Date: Jul. 20, 2015

(87) PCT Pub. No.: WO2014/111542
PCT Pub. Date: Jul. 24, 2014

(65) Prior Publication Data
US 2015/0321206 A1 Nov. 12, 2015

Related U.S. Application Data

(60) Provisional application No. 61/754,964, filed on Jan. 21, 2013.

(51) Int. Cl.
*A62C 31/00* (2006.01)
*B05B 1/04* (2006.01)
(Continued)

(52) U.S. Cl.
CPC ............ *B05B 1/046* (2013.01); *A01C 23/047* (2013.01); *A01G 25/09* (2013.01); *A01M 7/0042* (2013.01); *B05B 7/0425* (2013.01); *B05B 1/267* (2013.01)

(58) Field of Classification Search
CPC ... B05B 7/0087; B05B 7/1209; B05B 7/2437; B05B 5/032; B05B 15/02; B05B 1/34;
(Continued)

(56) References Cited

U.S. PATENT DOCUMENTS 4,645,127 A * 2/1987 Emory ................. B05B 7/0815
239/299
4,646,977 A * 3/1987 Iwamura .................. B05B 1/02
239/590.5
(Continued)

FOREIGN PATENT DOCUMENTS

WO 2009/154567 12/2009

OTHER PUBLICATIONS

International Search Report for International Patent Application No. PCT/EP2014/050944 mailed Apr. 10, 2014.

Primary Examiner — Davis Hwu
(74) Attorney, Agent, or Firm — R. Kody Jones

(57) ABSTRACT

Various methods and apparatuses may be used to spray sloped surfaces, such as by using a nozzle (1). The method of the invention for spraying a fluid on turf having sloped surfaces may include spraying the fluid using a flat fan spray angle between 110 and 130 degrees and an inclination angle between 4.5 and 9.0 degrees. In some implementations, spraying the fluid may include spraying the fluid using a flat fan spray angle of approximately 120 or 127 degrees. In some implementations, spraying the fluid may include spraying the fluid using an inclination angle of approximately 4.5 degrees. In some implementations, spraying the fluid may include spraying the fluid using an inclination
(Continued)

angle of approximately 6.5 degrees. In some implementations, spraying the fluid may include spraying the fluid using an inclination angle of approximately 9.0 degrees. In some implementations, the inclination angle may include a backward facing angle. In some implementations, the orifice of the nozzle (1) is formed by the interaction of a bent "vee" slot cut (10) though a hemispherically terminated hole creating a truncated elliptical orifice hole.

16 Claims, 15 Drawing Sheets

(51) Int. Cl.
| | | |
|---|---|---|
| *A01C 23/04* | (2006.01) | |
| *A01G 25/09* | (2006.01) | |
| *A01M 7/00* | (2006.01) | |
| *B05B 7/04* | (2006.01) | |
| *B05B 1/26* | (2006.01) | |

(58) Field of Classification Search
CPC ..... B05B 7/2405; B05B 7/0425; B05B 1/046; B05B 1/267
USPC .......................................... 239/398, 589, 599
See application file for complete search history.

(56) References Cited

U.S. PATENT DOCUMENTS

| | | | | |
|---|---|---|---|---|
| 4,957,242 | A * | 9/1990 | Schadow | B01F 5/0256 239/590 |
| 7,243,861 | B2 * | 7/2007 | Foubert | B05B 7/0425 239/469 |
| 7,552,881 | B2 * | 6/2009 | Lipthal | B05B 1/042 239/432 |
| 2003/0234301 | A1 | 12/2003 | Swan et al. | |
| 2008/0290197 | A1 * | 11/2008 | Fecht | B05B 1/042 239/599 |

* cited by examiner

US 9,630,189 B2

METHOD AND APPARATUS FOR SPRAYING GROUND SURFACES

RELATED APPLICATION INFORMATION

This application is a 371 of International Application No. PCT/EP2014/050944, filed 17 Jan. 2014, which claims the benefit of U.S. Patent Application No. 61/754,964 filed 21 Jan. 2013, the contents of which are incorporated by reference herein.

FIELD OF THE INVENTION

The disclosure relates to an apparatus and method for spray application of various agricultural chemicals to turf surfaces and in particular to a method and spray nozzle for more evenly spraying ground surfaces such as turf grass at varying spray boom heights and/or over ground having sloped topographies.

BACKGROUND OF THE INVENTION

Application of agricultural chemicals to turf grass with conventional spray nozzles and existing equipment over ground having slopes and undulations can cause uneven spray distribution. In addition, wind can cause spray drift, where fluid sprayed from a nozzle does not reach its intended surface. This results in inefficient spraying and unevenly applied fluid, where portions of a target surface receive too much or too little fluid. For example, when applying fluid such as water, fertilizer, pesticides, etc., the target soil and/or foliage may not receive an even distribution of the applied fluid.

Nozzles have been developed to address some of these problems. For example, air inclusion nozzles create droplets of fluid mixed with air, which can reduce spray drift and improve surface coverage of the fluid. However, while these conventional nozzles perform adequately when used to spray on a flat surface they fail to provide satisfactory coverage when used to spray on surfaces and undulations, or where spray boom height keeps varying or is low to the ground. For example, striping can occur when there is uneven agrochemical distribution, such as when a nozzle is further from one surface area is higher or lower than another surface area. This typically occurs when the surface being sprayed has slopes, other differences in elevation, or is otherwise not flat, which is typical in golf courses, for example.

Thus, what is needed is a spray nozzle that can provide adequate coverage over surfaces that are sloped or otherwise are not flat and/or an improved coefficient of variation when used in plurality at varying heights on a conventional spray boom. What is further needed are methods of improving the coefficient of variation of nozzle arrays and methods for spraying surfaces that are sloped or otherwise are not flat. These and other problems exist.

SUMMARY OF THE INVENTION

According to various implementations of the invention, various methods and apparatus are described for spraying surfaces such as turf having sloped surfaces.

The present invention provides a nozzle for turf sprayers comprising a hydraulic nozzle whose orifice is formed by the interaction of a slot cut though a hemispherically terminated hole, the slot taking the form inwardly bent vee whose sides are inclined towards the center creating a truncated elliptical orifice hole (an ellipsoid with flat sides). In one implementation, the sides of the bent vee cut are inclined or bent at a point approximately ⅓ of the length of the side of the slot.

In a particular embodiment, the discharge orifice that is defined by a slot having an axis, an apex, and first and second sides, and wherein each of said sides is defined by first and second corresponding wall members, wherein:

(i) said first wall members of said first and second sides extend from said apex toward their respective sides at an acute angle relative to one another in a "vee" configuration to respective opposed edges spaced from the apex, and (ii) each of said respective second wall members extend from the edge of a corresponding respective first wall member at an obtuse angle relative to one another toward an outer surface of the tip;

(b) an inner member insertable into the lumen of the outer member, said inner member having a flange, a central ring, an extension, a lumen and at least one opening which cooperates with said plurality of air eduction openings in the outer member to educt air into the lumen of the inner member when liquid passed through the lumen of the inner member, into the extension of the outer member and out the discharge orifice of the tip of the outer member.

In another embodiment, a plurality of the inventive nozzles are associated in an array on a turf spray boom, wherein each of the respective nozzles comprise:

(a) an outer member having a flange, a central section, a cylindrical extension terminating in a tip, a lumen extending therethrough, and a plurality of air eduction openings, said tip including an outer surface and a discharge orifice that is defined by a slot having an axis, an apex, and first and second sides, and wherein each of said sides is defined by first and second corresponding wall members, wherein:

(i) said first wall members of said first and second sides extend from said apex toward their respective sides at an acute angle relative to one another in a "vee" configuration to respective opposed edges spaced from the apex, and (ii) each of said respective second wall members extend from the edge of a corresponding respective first wall member at an obtuse angle relative to one another toward an outer surface of the tip;

(b) an inner member insertable into the lumen of the outer member, said inner member having a flange, a central ring, an extension, a lumen and at least one opening which cooperates with said plurality of air eduction openings in the outer member to educt air into the lumen of the inner member when liquid passed through the lumen of the inner member, into the extension of the outer member and out the discharge orifice of the tip of the outer member. The shape of configuration of the discharge orifice formed by the interaction of the two-sided, 4 walled (2 walls on each side) slot cut though a hemispherically terminated hole in the nozzle tip is a truncated ellipsoid.

In some implementations, a nozzle having the truncated ellipsoidal orifice may be constructed to spray a flat fan spray angle between 110 and 130 degrees and an inclination angle between 4.5 and 9.0 degrees to compensate for forward movement of a spray vehicle. In some implementations, the nozzle may spray the fluid using a flat fan spray angle of approximately 127 degrees. In some implementations, the nozzle may spray the fluid using a flat fan spray angle of approximately 120 degrees. In some implementations, the nozzle may spray the fluid using an inclination angle of approximately 4.5 degrees. In some implementations, the nozzle may spray the fluid using an inclination angle of approximately 6.5 degrees. In some implementations, the nozzle may spray the fluid using an inclination angle of approximately 9.0 degrees. In some implementations, the inclination angle may include a backward facing angle.

In some implementations, for example, various methods may be used to spray sloped surfaces, such as by using the nozzle described above. In some implementations, a method for spraying a fluid on turf having sloped surfaces may include spraying the fluid using a flat fan spray angle between 110 and 130 degrees and an inclination angle between 4.5 and 9.0 degrees. In some implementations, spraying the fluid may include spraying the fluid using a flat fan spray angle of approximately 127 degrees. In some implementations, spraying the fluid may include spraying the fluid using a flat fan spray angle of approximately 120 degrees. In some implementations, spraying the fluid may include spraying the fluid using an inclination angle of approximately 4.5 degrees. In some implementations, spraying the fluid may include spraying the fluid using an inclination angle of approximately 6.5 degrees. In some implementations, spraying the fluid may include spraying the fluid using an inclination angle of approximately 9.0 degrees. In some implementations, the inclination angle may include a backward facing angle.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Figure 13:
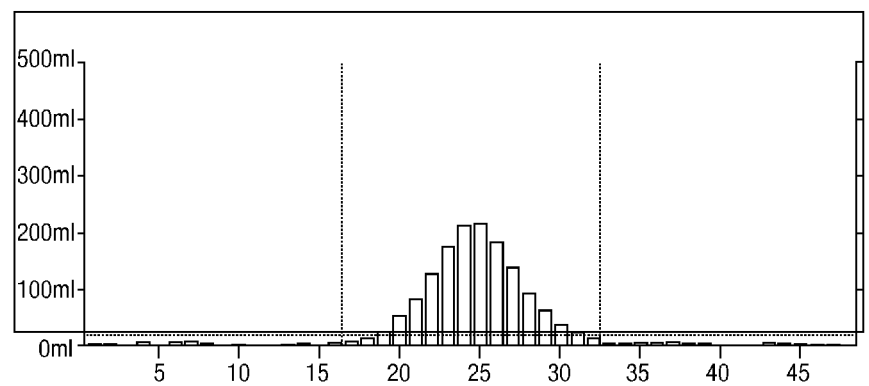
FIG. 13 is a chart illustrating a Conventional Fan Tip singular Patternation test at 500mm high.
Figure 14:
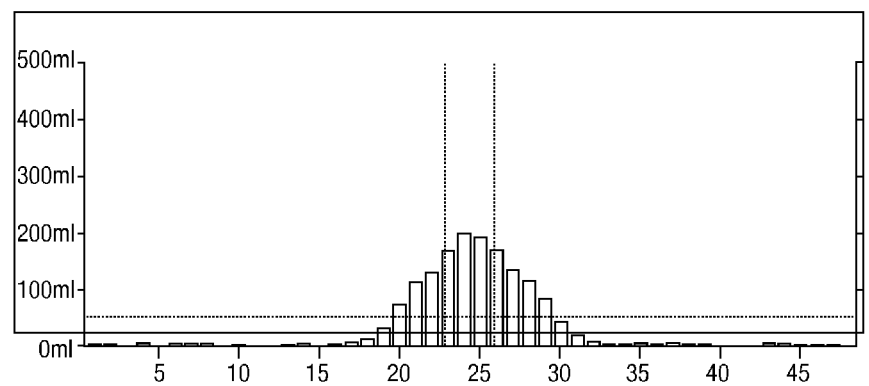
FIG. 14 is a chart illustrating a Fan Tip singular Patternation 500mm high test, according to various implementations of the invention.
Figure 15:
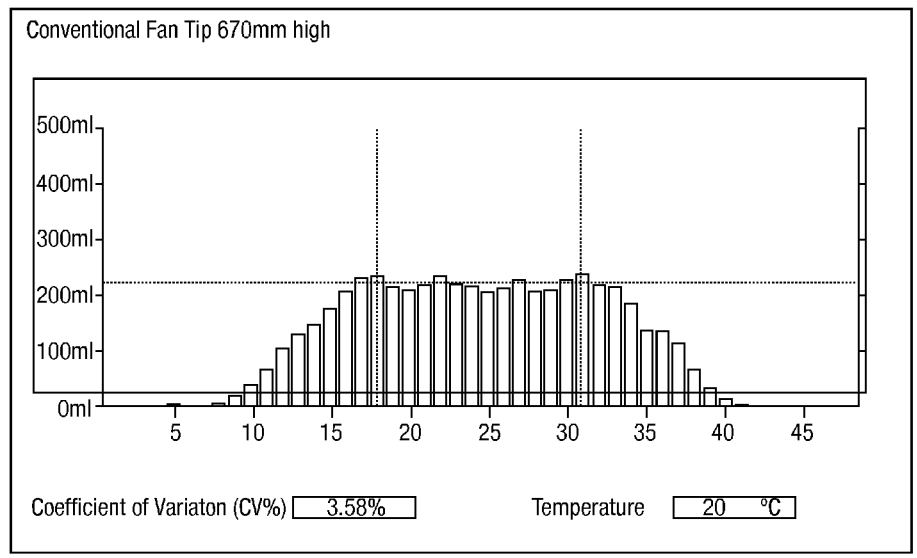
FIG. 15 is a chart illustrating a Conventional Fan Tip 5 nozzle array variation test at 670mm high.
Figure 16:
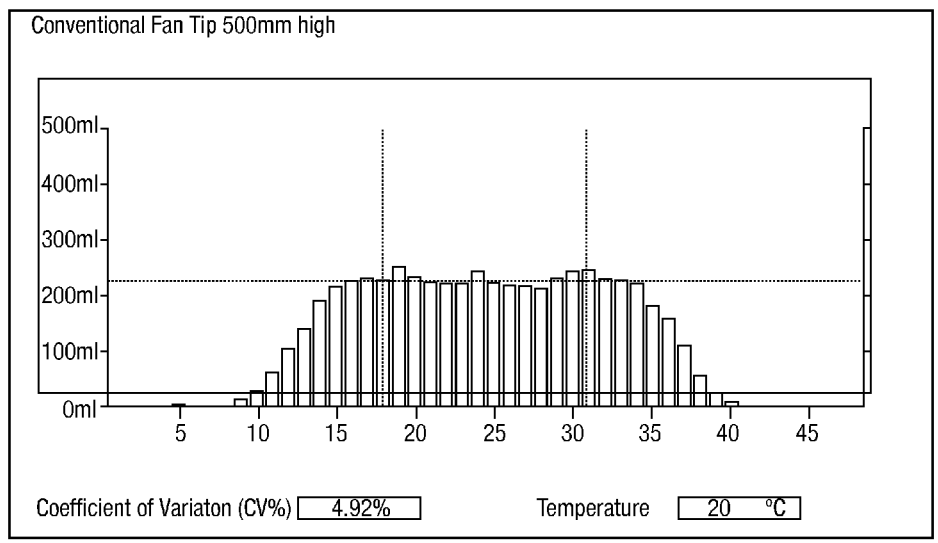
FIG. 16 is a chart illustrating a Conventional Fan Tip 5 nozzle array variation test at 500mm high.
Figure 17:
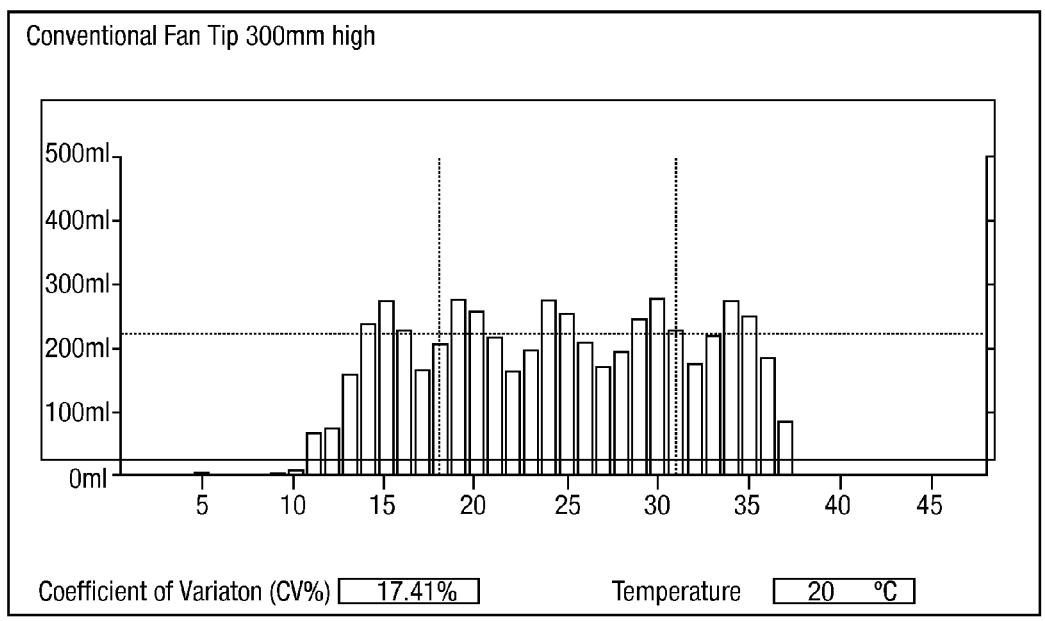
FIG. 17 is a chart illustrating a Conventional Fan Tip 5 nozzle array variation test at 300mm high.
Figure 18:
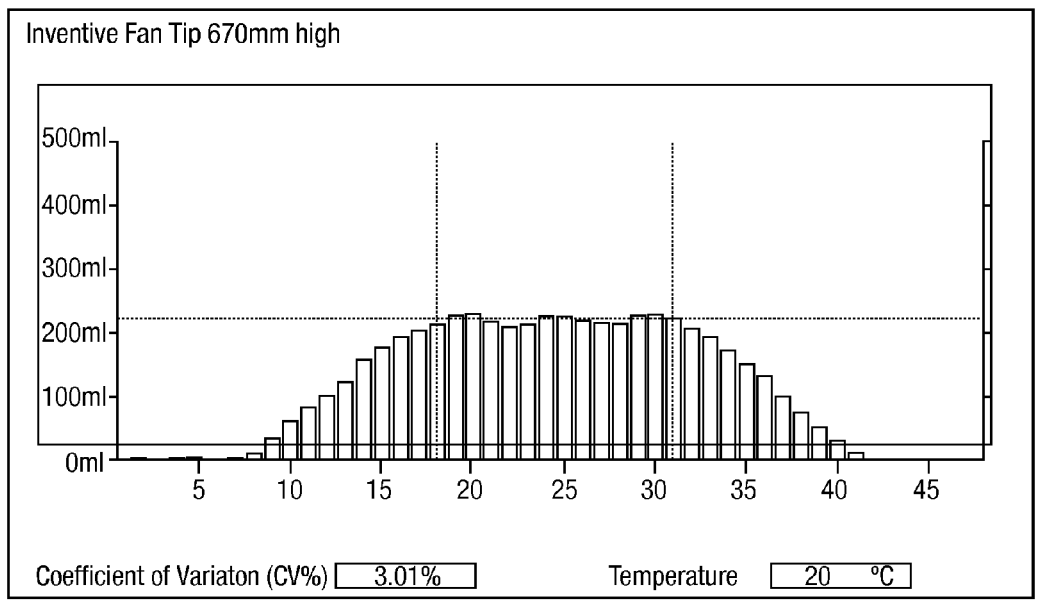
FIG. 18 is a chart illustrating a Fan Tip 5 nozzle array variation test at 670mm high, according to various implementations of the invention.
Figure 19:
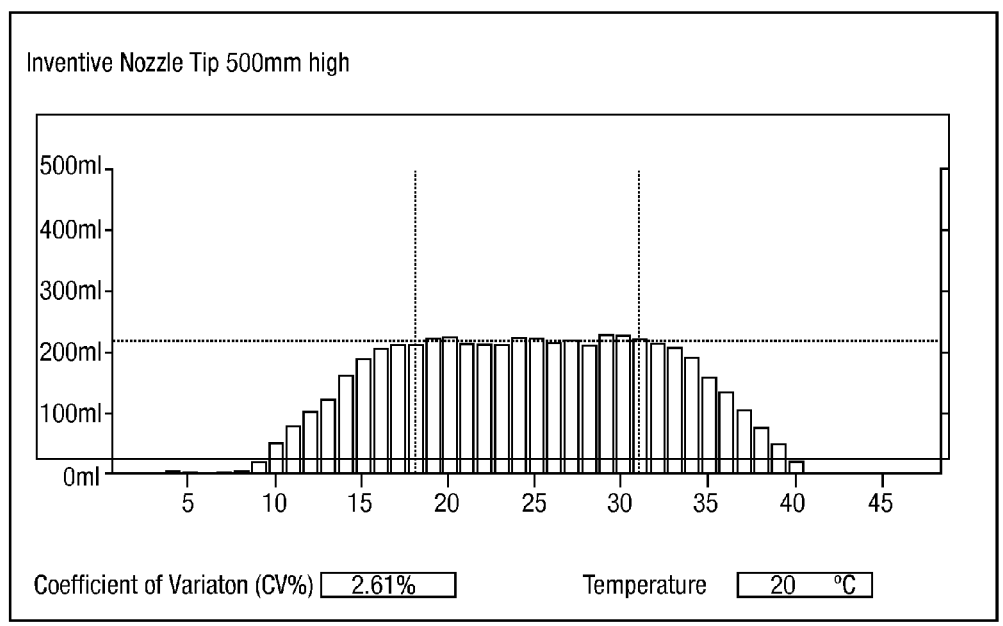
FIG. 19 is a chart illustrating a Fan Tip 5 nozzle array variation test at 500mm high, according to various implementations of the invention.
Figure 20:
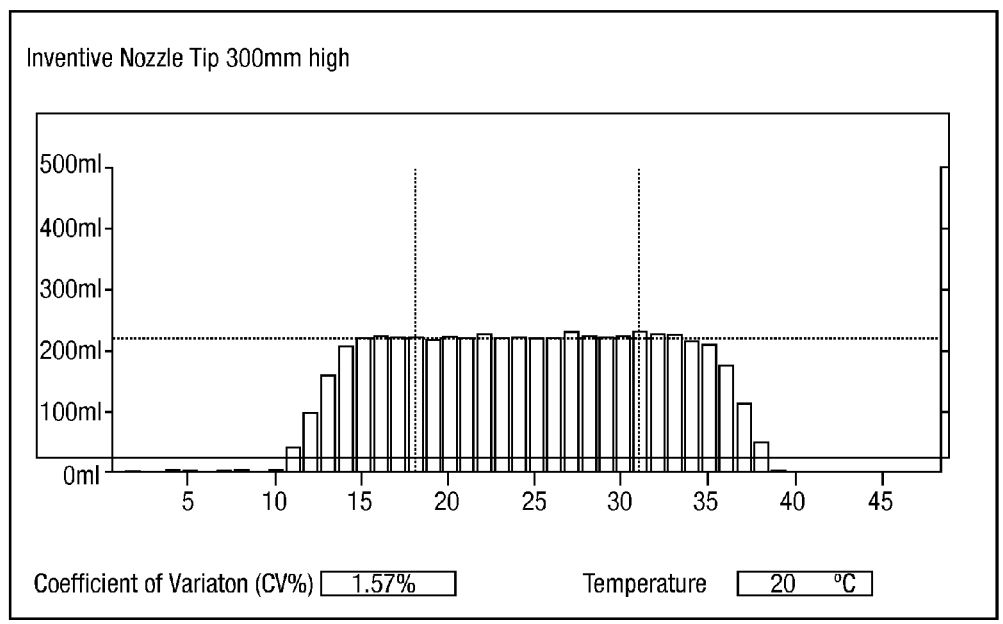
FIG. 20 is a chart illustrating a Fan Tip 5 nozzle array variation test at 300mm high, according to various implementations of the invention.

A brief description of FIG. 13 is provided above.
A brief description of FIG. 14 is provided above.
A brief description of FIG. 15 is provided above.
A brief description of FIG. 16 is provided above.
A brief description of FIG. 17 is provided above.
A brief description of FIG. 18 is provided above.
A brief description of FIG. 19 is provided above.
A brief description of FIG. 20 is provided above.

DETAILED DESCRIPTION OF THE INVENTION

According to various implementations of the invention, various methods and apparatus are disclosed for spraying plants and other foliage such as turf, including turf growing on sloped surfaces and in particular to turf on a golf course.

Conventional turf nozzles can include a 110 degree fan angle that is sprayed vertically downward and which have an orifice formed by the interaction of a vee shaped slot cut though a hemispherically terminated hole. While these turf nozzles performed adequately on flat surfaces, striping resulted when sprayed on sloped surfaces. In addition, a poor coefficient of variation between spraying a plurality of such nozzles can result when they are used in an array on a spray boom FIGS. 1-6 illustrate various views of a turf nozzle 1, according to various implementations of the invention. FIGS. 4, 6, and 7 illustrate various cross-sectional views of nozzle 1 along a plane A-A. FIGS. 7-8 illustrate various views of a semi-spherical tip of turf nozzle 1, according to various implementations of the invention. Referring to FIGS. 1-8, the nozzle 1 has an outer member 2 and an inner member 3. The nozzle 1 is designed to fit within a holder or cap (not illustrated in the Figures) designed to receive and hold standard ISO nozzles. As such, the nozzle 1 may be attached to standard booms and other delivery mechanisms.

In some implementations, the outer member 2 includes a flange 4 and a central section 5 each sized and shaped to cooperate with a standard cap design. Specifically, the central section 5 is designed to fit within an opening the cap and the flange 4 engage the surfaces of the cap to ensure the nozzle 1 remains affixed to the cap.

Figure 1:
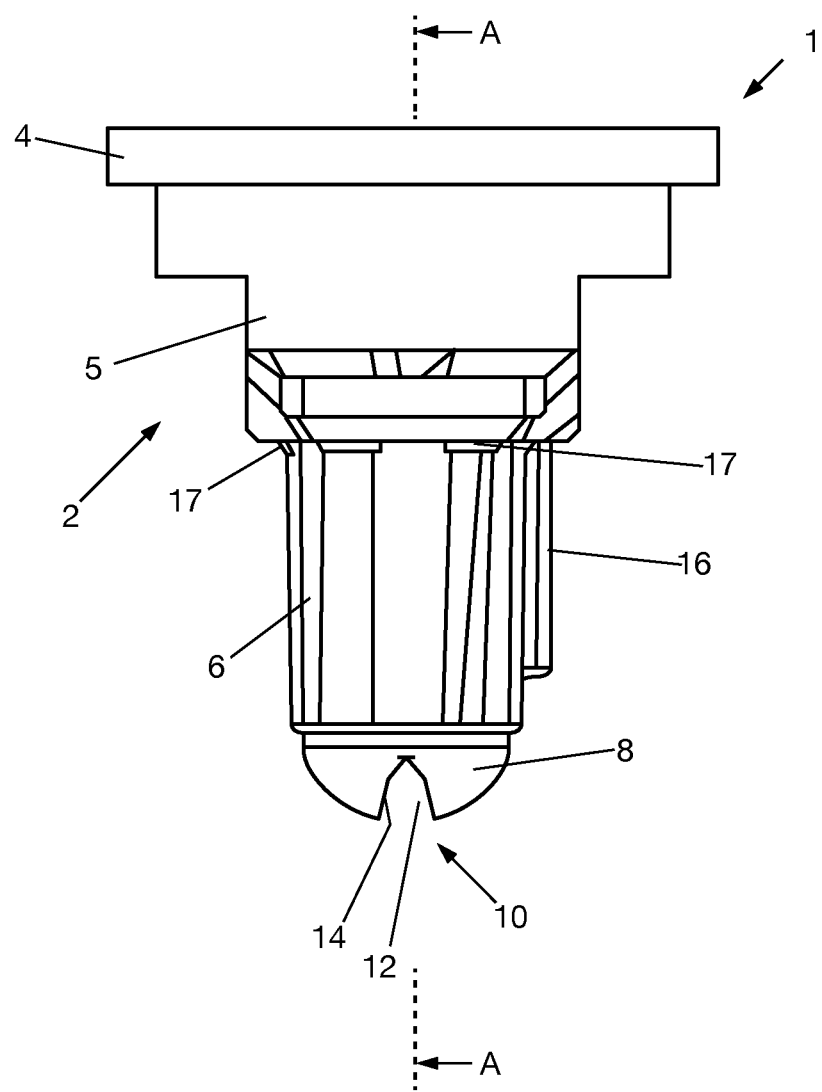
FIG. 1 illustrates a side view of a turf nozzle, according to various implementations of the invention.
Figure 2:
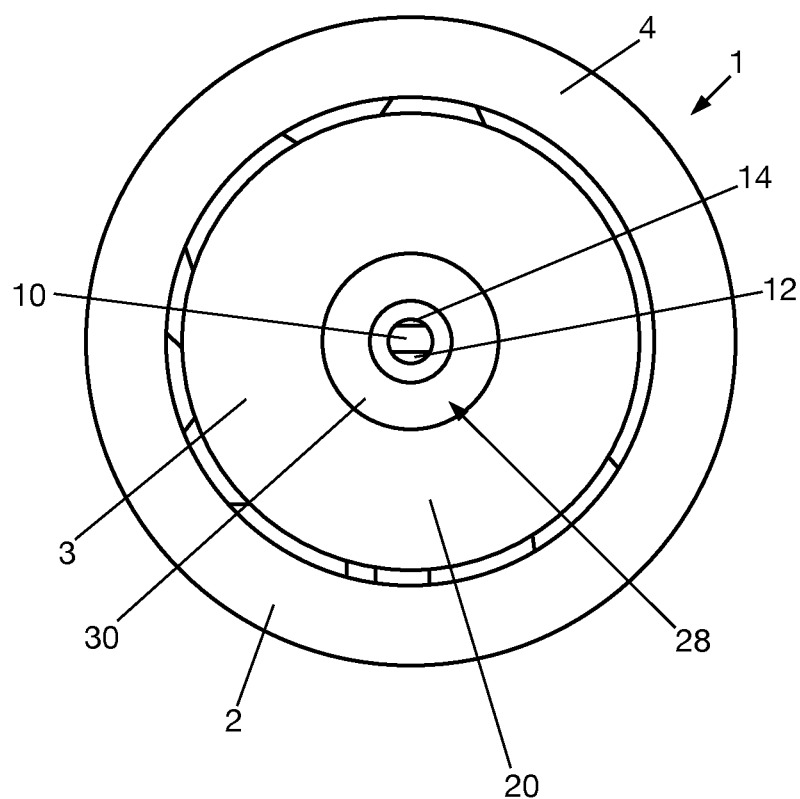
FIG. 2 illustrates a top view of a turf nozzle, according to various implementations of the invention.
Figure 3:
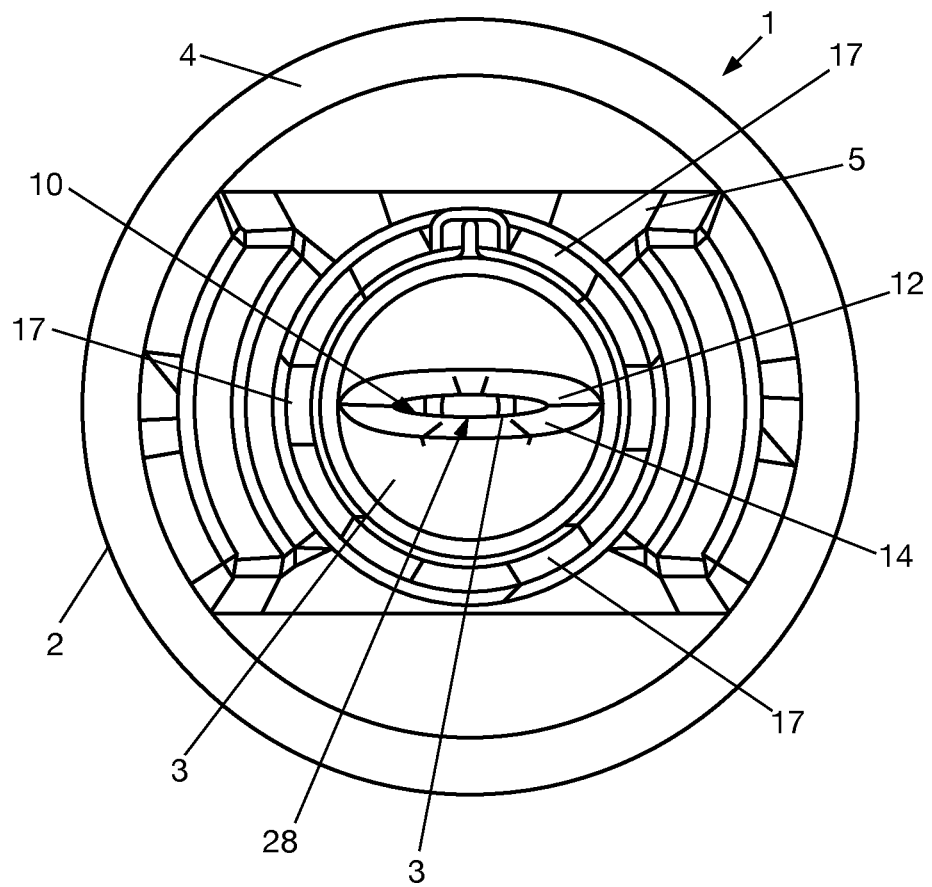
FIG. 3 illustrates a bottom view of a turf nozzle, which corresponds to those according to various implementations of the invention when adapted with nozzle orifice as shown in FIG. 12.
Figure 11:
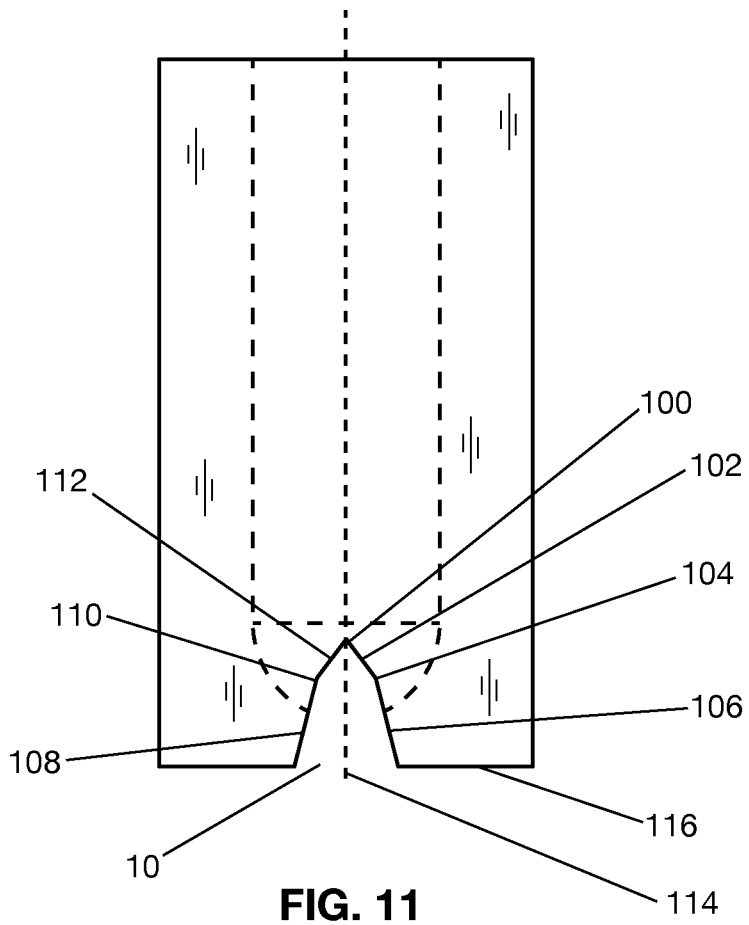
FIG. 11 illustrates a side (dotted interior) view of a nozzle orifice which is the a result of a bent vee cut through a hemispherical blind hole resulting in an elliptical orifice with flattened sides, according to various implementations of the invention.

In some implementations, the outer member 2 includes a generally cylindrical extension 6 that terminates in a semi-spherical tip 8. The tip 8 has a generally bent V-shaped discharge slot 10 formed by first and second sides 12 and 14. As shown in FIG. 11, the first side 12 and second side 14 are defined by opposed first (102 and 112) and second (106 and 108) wall members. The first wall members 102/112 extend from an apex 100 of the slot 10 at an acute angle relative to one another to respective opposed edges (110/104) spaced from the apex 100. In one embodiment, the edges (110/104) are spaced at a point approximately ⅓ of the length of the side of the slot. Each of said respective second wall members (106/108) extend from the edge (110/104) of a corresponding respective first wall member at an obtuse angle relative to one another toward an outer surface 116 of the tip. The side 12 is generally parallel to the longitudinal (vertical) axis of the nozzle 1, but can be offset from the vertical axis. The side 14 is not parallel to this axis and, instead, extends at an angle in the range of approximately 21 to 29.5 degrees from the longitudinal axis. Alternatively, these angles are measured relative to the axis of the slot (FIG. 11, item 114). To provide a clear indication of which side is parallel and which side is angled, an exterior projection 16 is provided (FIG. 1). As illustrated, projection 16 is on the side of the side 12 and opposite that of side 14.

In some implementations, nozzle 1 includes a plurality of openings 17 between the central section 5 and the cylindrical extension 6. In these implementations, the openings 17 provide a path for air to be educted into the flow stream. In some implementations, the plurality of openings (two, for example) can be arranged on the side of the nozzle cylindrical body spaced from the exterior projection 16 as can be seen, for example, in the nozzle design depicted in European registered community design RCD 001377915-0001 (air eduction openings on side).

Figure 4:
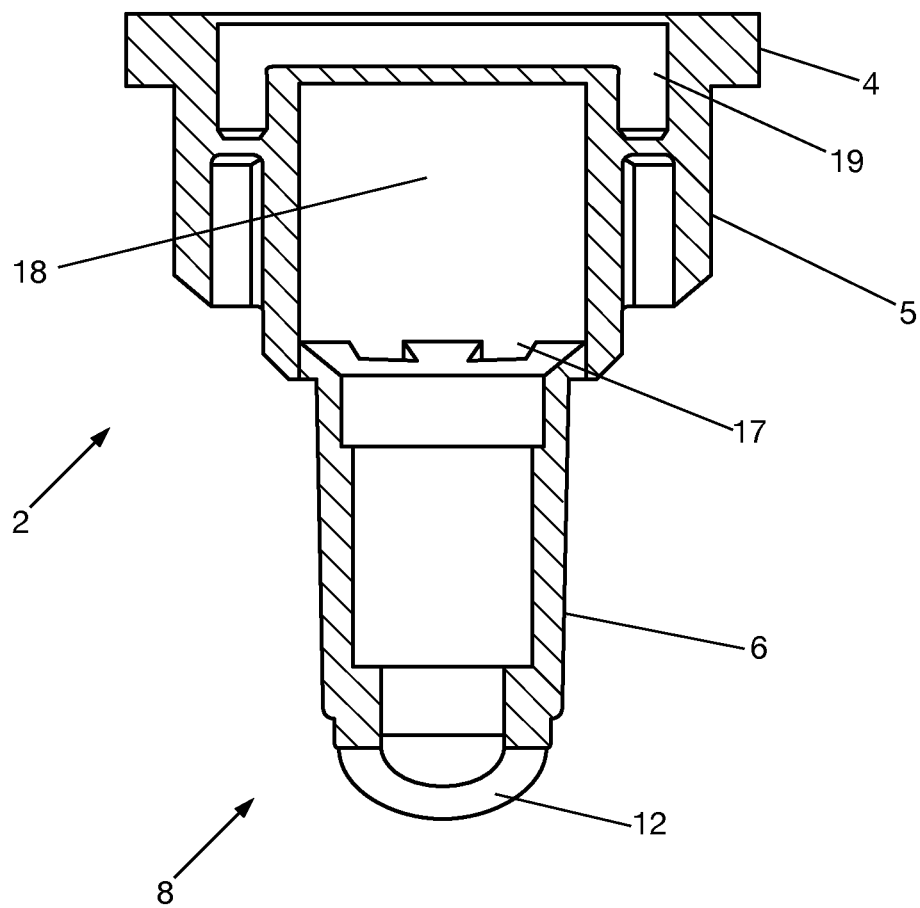
FIG. 4 illustrates a cross-sectional view of the outer member of a turf nozzle, according to various implementations of the invention.

In some implementations, outer member 2 includes an inner lumen 18 (see, e.g., FIG. 4) which is wider in the area of the flange 4, has a smaller diameter in the area of the central section 5, and is smaller yet in the area of the extension 6.

Surrounding the lumen 18 in the area of the flange 4 is a channel 19 that is used to lock the inner member 3 to the outer member 2.

Figure 5:
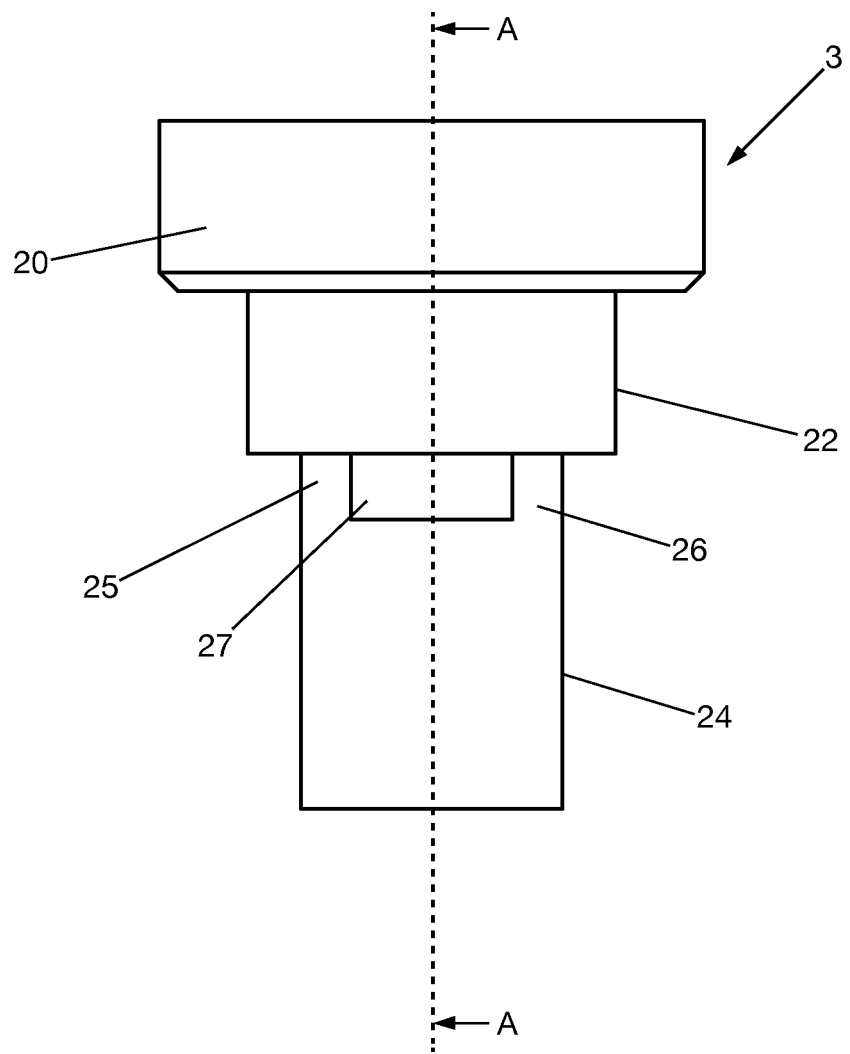
FIG. 5 illustrates a side view of the inner member of a turf nozzle, according to various implementations of the invention.
Figure 6:
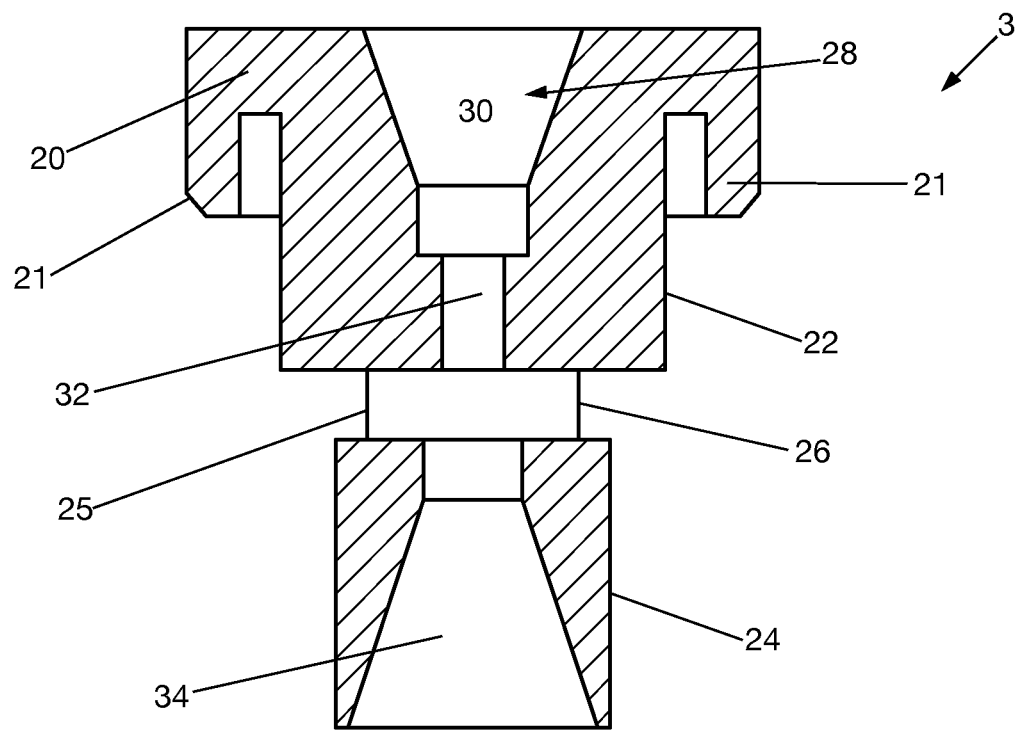
FIG. 6 illustrates a cross-sectional view of the inner member of a turf nozzle, according to various implementations of the invention.

FIGS. 5 and 6 illustrate the construction of the inner member 3. The inner member 3 has a flange 20 having a projection 21 that fits within the channel 19 of the outer member 2. The inner member 3 also has a central ring 22 and an extension 24. The space 27 between the extension 24 and the ring 22 is generally open. A pair of posts 25 and 26 hold the ring 22 and extension 24 in spaced apart relation.

FIG. 6 is viewed in cross-section along plane A-A and illustrates the shape of the lumen 28 that runs through the inner member 3, according to various implementations of the invention. As illustrated, the lumen 28 has a frusto-conical portion 30 in the area of the flange 20.

Lumen 28 narrows to a cylindrical section 32 in the area of the ring 22 and has a frusto-conical section 34 in the area of the extension 24.

Figure 7:
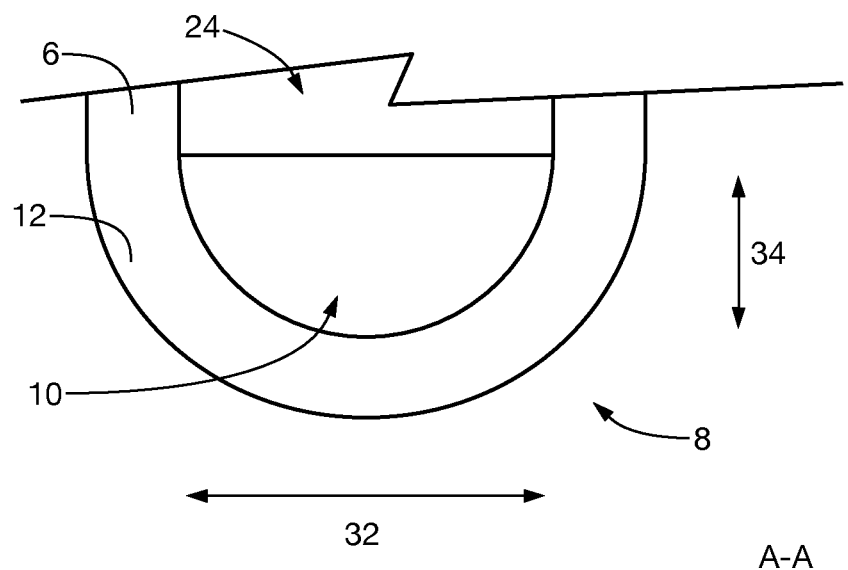
FIG. 7 illustrates a cross-sectional view of a semi-spherical tip of a turf nozzle, according to various implementations of the invention.
Figure 8:
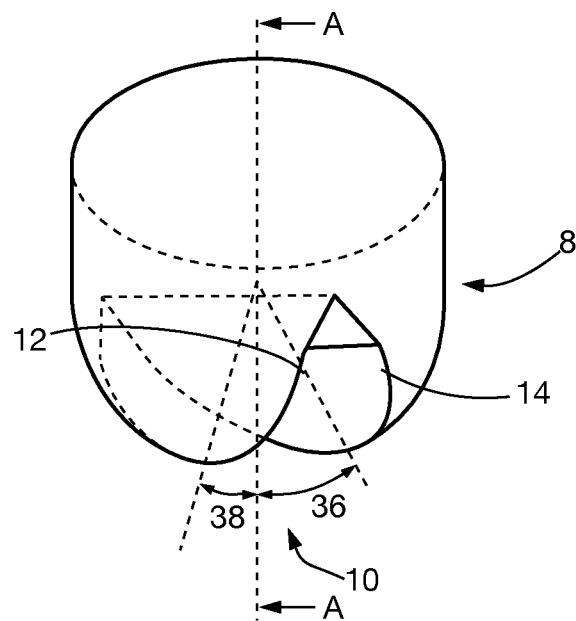
FIG. 8 illustrates a side view of a semi-spherical tip of a turf nozzle, according to various implementations of the invention.

When the inner and outer members are assembled, the end of the extension 24 of the inner member 3 resides within the extension 6 of the outer member 2. Also, a chamber is created between the outer wall of the extension 24 of the inner member 3 and the inner wall of the central section 5 of the outer member 2. This chamber, in combination with the openings 17 of the outer member 2 and the space between the ring 22 and the extension 24 of the inner member 3, creates a flow path through which air can be educted into the stream of liquid passing through the nozzle 1. That stream of liquid passes through the lumen 28 of the inner member 3, mixes with the air, passes through the extension 6 of the outer member 2 and then through the slot 10. The nature of the flow path and the shape of the slot 10 (examples of which are illustrated in FIGS. 7, 8 and 11) give the fluid exiting the nozzle 1 the same motion as if the boom were tipped backward at various degrees. In other words, in some implementations, the dimensions of slot 10 may be configured so that a backward inclination angle is achieved.

Figure 12:
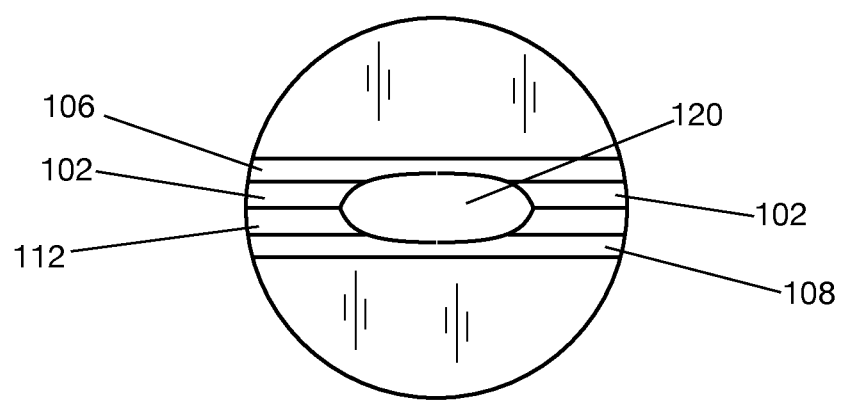
FIG. 12 illustrates a bottom view of a nozzle orifice which is the a result of a bent vee cut through a hemispherical blind hole resulting in an elliptical orifice with flattened sides, according to various implementations of the invention.

FIGS. 7 and 8 illustrate dimensions of slot 10, according to various implementations of the invention. Referring to FIG. 7, tip 8 is viewed in cross-section, along plane A-A. The lumen of extension 24 is in fluid communication with slot 10. In some implementations, along wall 12, slot 10 has a width dimension 32 and a height dimension 34, oriented generally perpendicular to extension 6. Width dimension 32 and height dimension 34 together define dimensions of slot 10 along wall 12 in a truncated elliptical configuration (FIG. 12, item 120). Referring to FIG. 8, angles 36 and 38 together define the opening of slot 10 as viewed from the side. Angle 36 represents an angle by which wall 14 is offset from a vertical axis (illustrated in FIG. 8 by the line A-A, which also defines plane A-A). The vertical axis runs generally parallel to extension 6. Angle 38 represents an angle by which wall 12 is offset from the vertical axis. Dimensions 32 and 34 and angles 36 and 38 together define the angle of inclination and fan spray angle emitted from slot 10.

Table 1 illustrates various examples of dimensions 32 and 34 (measured in millimeters) and angles 36 and 38 (measured in degrees) that can achieve various angles of inclination and fan spray angles when used with various nozzle bodies of appropriate dimension. Each of dimensions 32, 34 and angles 36, 38 may have values substantially or "approximately" (i.e., within a +/−range) as illustrated in Table 1. As illustrated, in some implementations, wall 12 may be offset from the vertical axis by 1.2 to 2.5 degrees.

TABLE 1

| Angle of inclination | Fan spray angle | Width 32 | Angle 36 | Angle 38 | Height 34 |
|---|---|---|---|---|---|
| 6.5 | 110 | 2.425 (+/−0.050) | 21.0 (+/−0.5) | 2.5 (+/−0.5) | 1.338 (+/−0.050) |
| 4.0 | 127 | 2.550 (+/−0.050) | 29.5 (+/−0.5) | 2.5 (+/−0.5) | 1.400 (+/−0.050) |
| 9.0 | 127 | 4.000 (+/−0.050) | 28.2 (+/−0.5) | 1.2 (+/−0.5) | 2.125 (+/−0.050) |

The dimensions of slot 10 illustrated by in FIGS. 7-8 and Table 1 are examples only and may be adjusted so long as their relative relationships to one another are appropriately scaled/preserved, as would be appreciated. Thus, the dimensions may be modified according to particular needs based on the dimensions disclosed herein.

Nozzles constructed in accordance with the preferred embodiment offer a variety of advantages. First, such nozzles are preset to provide the correct delivery angle for the chemicals providing improved penetration into a crop canopy so the chemicals reach weeds hiding under crop foliage if the inventive nozzle or array thereof is used in broadcast spraying of row crops. Second, the nozzles of the present invention fit standard booms and standard nozzle body holders or caps. Third, no tools are needed to change the nozzles. Fourth, the inventive bent vee slot configuration permits the truncated ellipsoid nozzle orifices of the present invention to deliver a spray pattern having an improved coefficient of variation relative to conventional nozzles. Finally, the inventive nozzle can be constructed in a variety of sizes or designs either to fit different ISO or other sized caps, holders or configurations. For examples, nozzle designs such as those shown in European RCD 001377915-0001 can be modified with bent vee slot configuration resulting in nozzle orifices in accordance with the invention, and are considered withing the scope hereof.

According to various implementations of the invention, various methods may be used to spray surfaces including sloped surfaces, such as by using a nozzle in accordance with the invention such as 1 or a different design (e.g., European RCD 001377915-0001) as desired. In some implementations, a method for spraying a fluid on turf which may have sloped surfaces can include spraying the fluid using a flat fan spray angle between 110 and 130 degrees and an inclination angle between 4.5 and 9.0 degrees. In some implementations, spraying the fluid may include spraying the fluid using a flat fan spray angle of approximately 127 degrees. In some implementations, spraying the fluid may include spraying the fluid using a flat fan spray angle of approximately 120 degrees. In some implementations, spraying the fluid may include spraying the fluid using an inclination angle of approximately 4.5 degrees. In some implementations, spraying the fluid may include spraying the fluid using an inclination angle of approximately 6.5 degrees. In some implementations, spraying the fluid may include spraying the fluid using an inclination angle of approximately 9.0 degrees. In some implementations, the inclination angle may include a backward facing angle.

Figure 9A:
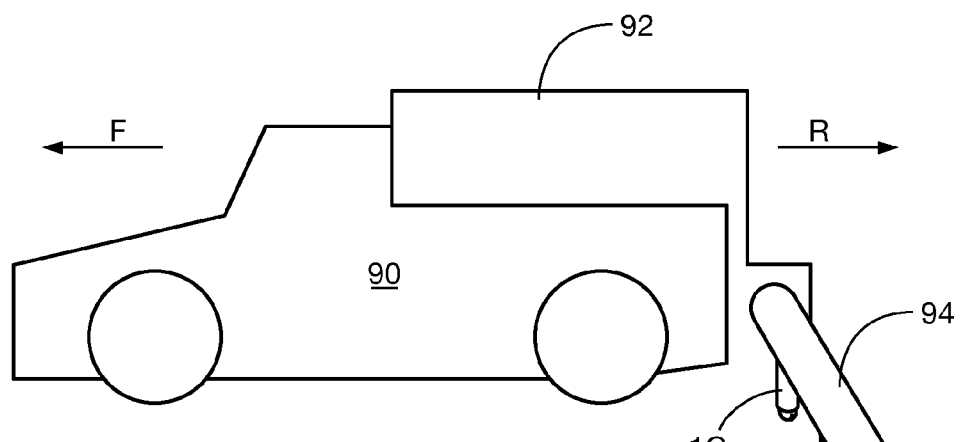
FIGS. 9A and 9B illustrate a schematic diagram of a system for spraying a surface including surfaces having sloped topographies, according to various implementations of the invention.

FIG. 9A illustrates an example of a plurality of air inclusion nozzles 1 (illustrated in FIG. 9A as nozzles 1A, 1B, 1C, although other numbers of nozzles may be used such as arrays of 5, 10, 15 or more.) coupled with a vehicle 90, according to various implementations of the invention. As illustrated, a reservoir 120 is mounted on or formed with vehicle 90. Reservoir 120 may contain (i.e., be a source of) a fluid to be sprayed onto a surface that generally includes foliage such as turf. The fluid may include any liquid such as, without limitation, water, fertilizer, foliage protectants (e.g., pesticides, fungicides, etc.), and/or other liquid that can be sprayed onto a surface. Although vehicle 90 may occasionally travel in a reverse direction ("R") for maneuvering purposes, the fluid is applied while vehicle 90 generally travels in a forward direction ("F").

In some implementations of the invention, a boom 94 is coupled to reservoir 120 and receives the fluid for distribution via attached nozzles 1 (illustrated in FIG. 1 as air inclusion nozzle 1A, air inclusion nozzle 1B, and air inclusion nozzle 1C), various implementations of which are described herein. Generally, though not necessarily, boom 94 is adjacent to a rear of vehicle 90 as illustrated in FIG. 1A.

Figure 9B:
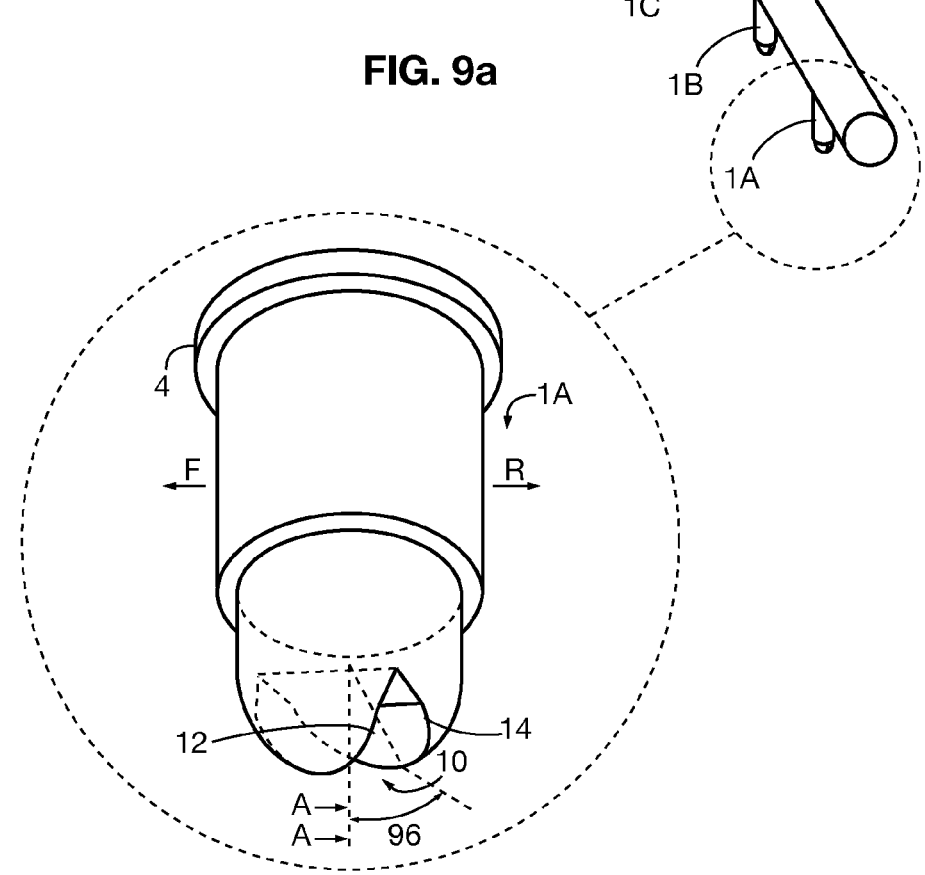
Figure 10:
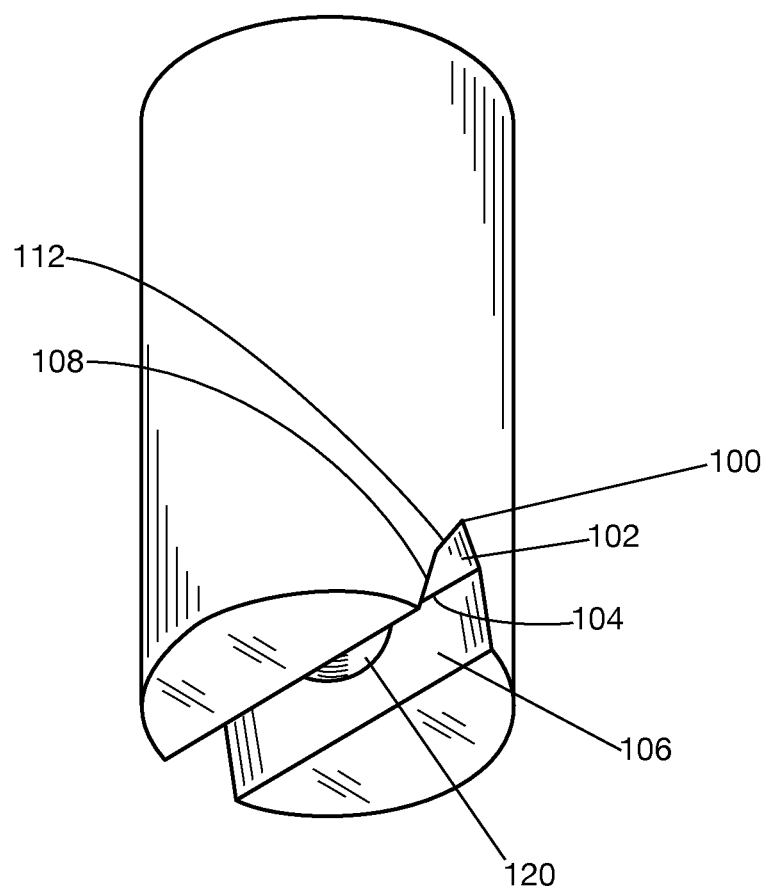
FIG. 10 illustrates a perspective view of a nozzle orifice which is the result of a bent vee cut through a hemispherical blind hole resulting in an elliptical orifice with flattened sides.

FIG. 9B illustrates a schematic elevation view of one of the plurality of nozzles 1 (such as nozzle 1A) illustrated in FIG. 9A, according to various implementations of the invention. Nozzle 1 is illustrated in FIG. 9B in an orientation in which it is coupled to boom 94 via flange 4. In other words, nozzle 1 is illustrated in FIG. 9B in an operational configuration. In some implementations of the invention, slot 10 causes the fluid to be sprayed ("S") in a flat fan configuration having various fan angles suitable for spraying sloped surfaces such as those listed in Table 1. In some implementations of the invention, the flat fan configuration has a fan angle of generally between 110 and 130 degrees.

In some implementations of the invention, air inclusion nozzle 1 (FIG. 1) sprays the flat fan configuration at a backward-facing angle 96 relative to a vertical line from air inclusion nozzle 1 to the ground (nozzle illustrated in FIGS. 8 and 9B, for example, as cross-section line A-A). In other words, instead of spraying the fluid straight down toward the surface and along line A-A, which generally runs parallel through the center of nozzle 1, the nozzle is configured to spray the fluid S toward the reverse direction R at a backward-facing angle 96 relative to line A-A. For example, when installed or otherwise coupled with boom 94, air inclusion nozzle 1 sprays the fluid S toward the reverse direction. In some implementations, backward-facing angle 96 can range from approximately 4.5 to 9.0 degrees.

In other implementations, a plurality of nozzles having a bent vee slot as described in FIG. 11 and a truncated ellipsoidal spray orifice 120 as shown in FIG. 12 are associated, installed or otherwise coupled with boom 94 a surprising improvement in the coefficient of variation between the spray pattern of the nozzles in the array can be observed.

By doing so, problems associated with spraying sloped surfaces or variations in boom height may be mitigated.

EXAMPLES

The following examples are provided for illustration purposes and should not be considered as limiting the scope of the invention. General description of screening methods: Following the method of ISO 5682-1 and/or ISO/WD 5682-1 "Equipment for crop protection—Spraying equipment—Part 1, the coefficient of variability between a plurality of spray nozzles on a spray boom operating at various heights is tested. 5 nozzles are used with the test bench. The test method of ISO 5682-1 and/or ISO/WD 5682-1 is followed except for width of the slots in the test bench.

FIG. 13 is a chart illustrating a Conventional Fan Tip singular Patternation test at 500 mm high.

FIG. 14 is a chart illustrating a Fan Tip singular Patternation 500 mm high test, according to various implementations of the invention.

FIG. 15 is a chart illustrating a Conventional Fan Tip 5 nozzle array variation test at 670 mm high.

FIG. 16 is a chart illustrating a Conventional Fan Tip 5 nozzle array variation test at 500 mm high.

FIG. 17 is a chart illustrating a Conventional Fan Tip 5 nozzle array variation test at 300 mm high.

FIG. 18 is a chart illustrating a Fan Tip 5 nozzle array variation test at 670 mm high, according to various implementations of the invention.

FIG. 19 is a chart illustrating a Fan Tip 5 nozzle array variation test at 500 mm high, according to various implementations of the invention.

FIG. 20 is a chart illustrating a Fan Tip 5 nozzle array variation test at 300 mm high, according to various implementations of the invention.

Although described herein as a turf nozzle, the nozzle and methods for spraying sloped surfaces may be used to spray any surface having sloped topographies. A reference symbol appearing in different figures represents the same feature, structure, or characteristic in the different figures. For example, different figures may illustrate different views of an air inclusion nozzle, where a figure may reuse a reference symbol from a prior figure for convenience. As such, a reference symbol appearing in two or more different figures represents the same feature, structure or characteristic as described in a prior figure.

As would be appreciated by those skilled in the art, according to common practice, the various features of the drawings discussed herein are not necessarily drawn to scale, and that dimensions of various features, structures, or characteristics of the drawings may be expanded or reduced to more clearly illustrate various implementations of the invention described herein.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. An air inclusion spray nozzle for spraying a fluid on sloped surfaces, comprising:

a body having an internal chamber disposed therein, the internal chamber configured to receive the fluid;

a plurality of openings coupled to the internal chamber, the plurality of openings configured to allow air to enter the internal chamber, wherein the air combines with the fluid in the internal chamber to form an air inducted fluid comprising a mixture of at least some of the fluid and at least some of the air; and a slot coupled to a distal end of the internal chamber, the slot configured to form a truncated elipsoid orifice for receiving the air inducted fluid from the internal chamber and emit the air inducted fluid as droplets in a spray pattern having a coefficient of variation of from 1.5 to 3 when employed in an array on a spray boom at a height between about 300 mm and 500 mm from a ground service.

2. The air inclusion nozzle of claim 1, wherein said body comprises:

(a) an outer member having an outer member flange, a central section, a cylindrical extension terminating in a tip, an outer member lumen extending therethrough, and a plurality of air eduction openings, said tip including an outer surface and a discharge orifice defining said slot, said slot having an axis, an apex, and first and second sides, and wherein each of said first and second sides is defined by first and second corresponding wall members, wherein:

(i) said first wall members of said first and second sides extend from said apex toward their respective sides at an acute angle relative to one another in a "vee" configuration to respective opposed edges spaced from the apex, and (ii) each of said respective second wall members extend from an opposed edge of a corresponding respective first wall member at an obtuse angle relative to one another toward an outer surface of the tip; and (b) an inner member insertable into the outer member lumen, said inner member having an inner member flange, a central ring, an extension, an inner member lumen and at least one inner member opening which cooperates with said plurality of air eduction openings in the outer member to educt air into the inner member lumen when liquid passes through the inner member lumen, into the cylindrical extension of the outer member and out the discharge orifice of the tip of the outer member, wherein said plurality of openings coupled to the internal chamber are represented by (i) said plurality of air eduction openings of said outer member, and (ii) said at least one inner member opening.

3. A plurality of nozzles arranged in an array on a sprayer boom, wherein said plurality of nozzles comprises multiple nozzles of claim 1.

4. A method for reducing the coefficient of variability between a plurality of spray nozzles arrayed on a spray boom when operating at various heights during spray application which comprises spraying a fluid with a plurality of nozzles according to claim 3.

5. A plurality of nozzles arranged in an array on a sprayer boom, wherein said plurality of nozzles comprises multiple nozzles of claim 2.

6. A method for reducing the coefficient of variability between a plurality of spray nozzles arrayed on a spray boom when operating at various heights during spray application which comprises spraying a fluid with a plurality of nozzles according to claim 5.

7. A method for spraying a fluid on turf having sloped surfaces, comprising:

spraying the fluid using a flat fan spray angle between 110 and 130 degrees and an inclination angle between 4.5 and 9.0 degrees with a nozzle according to claim 1.

8. The method of claim 7, wherein spraying the fluid comprises spraying the fluid using a flat fan spray angle of approximately 127 degrees.

9. The method of claim 7, wherein spraying the fluid comprises spraying the fluid using a flat fan spray angle of approximately 120 degrees.

10. The method of claim 7, wherein spraying the fluid comprises spraying the fluid using an inclination angle of approximately 4.5 degrees.

11. The method of claim 7, wherein spraying the fluid comprises spraying the fluid using an inclination angle of approximately 6.5 degrees.

12. The method of claim 7, wherein spraying the fluid comprises spraying the fluid using an inclination angle of approximately 9.0 degrees.

13. The method of claim 7, wherein the inclination angle is a backward facing angle.

14. A method for spraying a fluid on turf having sloped surfaces, comprising:

spraying the fluid using a flat fan spray angle between 110 and 130 degrees and an inclination angle between 4.5 and 9.0 degrees with a nozzle according to claim 2.

15. The method of claim 14, wherein spraying the fluid comprises spraying the fluid using a flat fan spray angle of between approximately 120 degrees and approximately 127 degrees.

16. The method of claim 14, wherein spraying the fluid comprises spraying the fluid using an inclination angle of between approximately 6.5 degrees.

* * * * *